(12) United States Patent
Howe

(10) Patent No.: US 7,100,080 B2
(45) Date of Patent: Aug. 29, 2006

(54) WRITE CACHE RECOVERY AFTER LOSS OF POWER

(75) Inventor: Steven M. Howe, Rochester, MN (US)

(73) Assignee: Xiotech Corporation, Eden Prairie, MN (US)

( * ) Notice: Subject to any disclaimer, the term of this patent is extended or adjusted under 35 U.S.C. 154(b) by 660 days.

(21) Appl. No.: 10/430,535

(22) Filed: May 5, 2003

(65) Prior Publication Data

US 2003/0212921 A1 Nov. 13, 2003

Related U.S. Application Data

(60) Provisional application No. 60/379,000, filed on May 8, 2002.

(51) Int. Cl.
*G06G 11/00* (2006.01)

(52) U.S. Cl. ......................................... 714/24; 711/135
(58) Field of Classification Search ................. 711/135
See application file for complete search history.

(56) References Cited

U.S. PATENT DOCUMENTS

| | | | |
|---|---|---|---|
| 5,448,719 A | | 9/1995 | Schultz et al. |
| 5,644,701 A | * | 7/1997 | Takewaki ..................... 714/20 |
| 5,761,406 A | * | 6/1998 | Kobayashi et al. ........... 714/24 |
| 5,895,488 A | | 4/1999 | Loechel |
| 6,295,577 B1 | | 9/2001 | Anderson et al. |
| 6,412,045 B1 | * | 6/2002 | DeKoning et al. .......... 711/135 |
| 6,557,077 B1 | * | 4/2003 | Ghosh et al. ............... 711/118 |
| 6,708,294 B1 | * | 3/2004 | Nakao et al. ................. 714/42 |
| 6,792,511 B1 | * | 9/2004 | Hameed ..................... 711/135 |
| 2003/0159001 A1 | * | 8/2003 | Chalmer et al. ............ 711/120 |

* cited by examiner

*Primary Examiner*—Bryce P. Bonzo
*Assistant Examiner*—Paul Contino
(74) *Attorney, Agent, or Firm*—McDermott Will & Emery LLP

(57) ABSTRACT

A method for recovering dirty write cache data after controller power loss or failure from one of two independently battery backed up and mirrored write caches. Two independent controllers jointly operate with a permanent data storage system. Each controller has a write cache that is a mirror of the write cache in the other controller. The primary controller resets a power down flag stored each write cache upon proper shutdown. The primary controller further increments and stores a configuration sequence number into each write cache upon proper shutdown. If a primary controller powers up and identifies that the write cache was not properly shutdown due to the state of the power down flag, it flushes the dirty data in the write cache only if the configuration sequence number contained in the write cache is the same as the configuration sequence number contained in the primary controller. If the configuration sequence number in the primary controller is higher than the configuration sequence number in the write cache, the dirty data was previously flushed to permanent data storage with the other write cache.

4 Claims, 2 Drawing Sheets

WRITE CACHE RECOVERY AFTER LOSS OF POWER

CROSS-REFERENCE TO RELATED APPLICATIONS

This application claims benefit of U.S. provisional patent application Ser. No. 60/379,000, filed May 8, 2002, which is herein incorporated by reference.

BACKGROUND OF THE INVENTION

1. Field of the Invention

The present invention generally relates to mass storage systems, and more particularly, to mass storage systems that store redundant data.

2. Description of the Related Art

A common method of speeding up access to data is to use a so-called write cache. This data is created when a host operating system stores data on permanent data storage. Rather than immediately store the data onto a storage device's hard disk drives, for example, the storage device's controller stores the data into its high-speed cache and signals to the he host operating system that the data has been successfully stored. This significantly speeds up the acknowledgment back to the host operating system that the data has been successfully stored. This data is also immediately available from high-speed cache memory if the host operating system issues a read request with respect to the data just written. When it is convenient to data storage system, the data in the write cache is flushed to the hard drive, where it now "permanently" stored.

Until the write cache data is actually stored on the hard disk drive, it remains "dirty." "Dirty" is a term of art to indicate that write cache data has yet to be written to permanent data storage. This data is vulnerable to being permanently lost if there is a power outage. Most, if not all, cache memories are volatile memories that need electric power in order to store data.

To lessen the risk of data loss in the case of power outages, some data storage systems employ battery backups so that the data in the write cache is not lost. When the power is restored, the data storage system must have a way of recognizing that dirty write cache data is present and should be written to permanent data storage. In some cases, the system environment may be altered while power is out such that it would be inappropriate to write the dirty write cache data to the read data storage on power up. For example U.S. Pat. No. 5,448,719 to Schulz et al. describes checking a so-called "configuration identification code" that verifies the correspondence between the write cache "board" and its disk drive system before the dirty data is written onto the disk drive system.

Many failsafe data storage systems provide, however, two independent controllers for storing data on the permanent data storage. If either of these fails the other one can continue to operate while the failed controller is replaced or repaired. In such an environment, it would be inappropriate for the dirty data in the write cache of the failed controller to be written to the data permanent data storage because the other controller continued to operate. Other these circumstances, the data environment changed even while the physical storage environment did not change.

Thus there is a need to provide restoration of dirty write cache data after loss of power in a storage system environment employing two independently powered write caches with two independently powered battery backups.

SUMMARY OF THE INVENTION

The present invention permits the restoration of dirty write cache data from a battery-powered write cache after loss of power when the write cache is part of a data storage system that employs a mirrored write cache that is independently powered and controlled. The data storage system maintains a storage configuration sequence number that is incremented after every successful power up and upon ever configuration change. This configuration sequence number is written into each write cache before any "new" data is written at the cache. Upon power up, the configuration sequence number of the storage system is compared to configuration sequence number stored in the write cache. If the numbers match and there is dirty data present in, the write cache, the dirty data is then flushed to the storage system for permanent storage on, for example, disk drives. If however, the sequence numbers do not match, the dirty data is not written to the system. Rather, if the sequence number on the write cache is lower than a configuration number of the storage system, the dirty data and flags indicating the presence of dirty data are cleared from the write cache. The lower sequence number indicates that the dirty data has previously been restored from the mirrored independently powered write cache.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
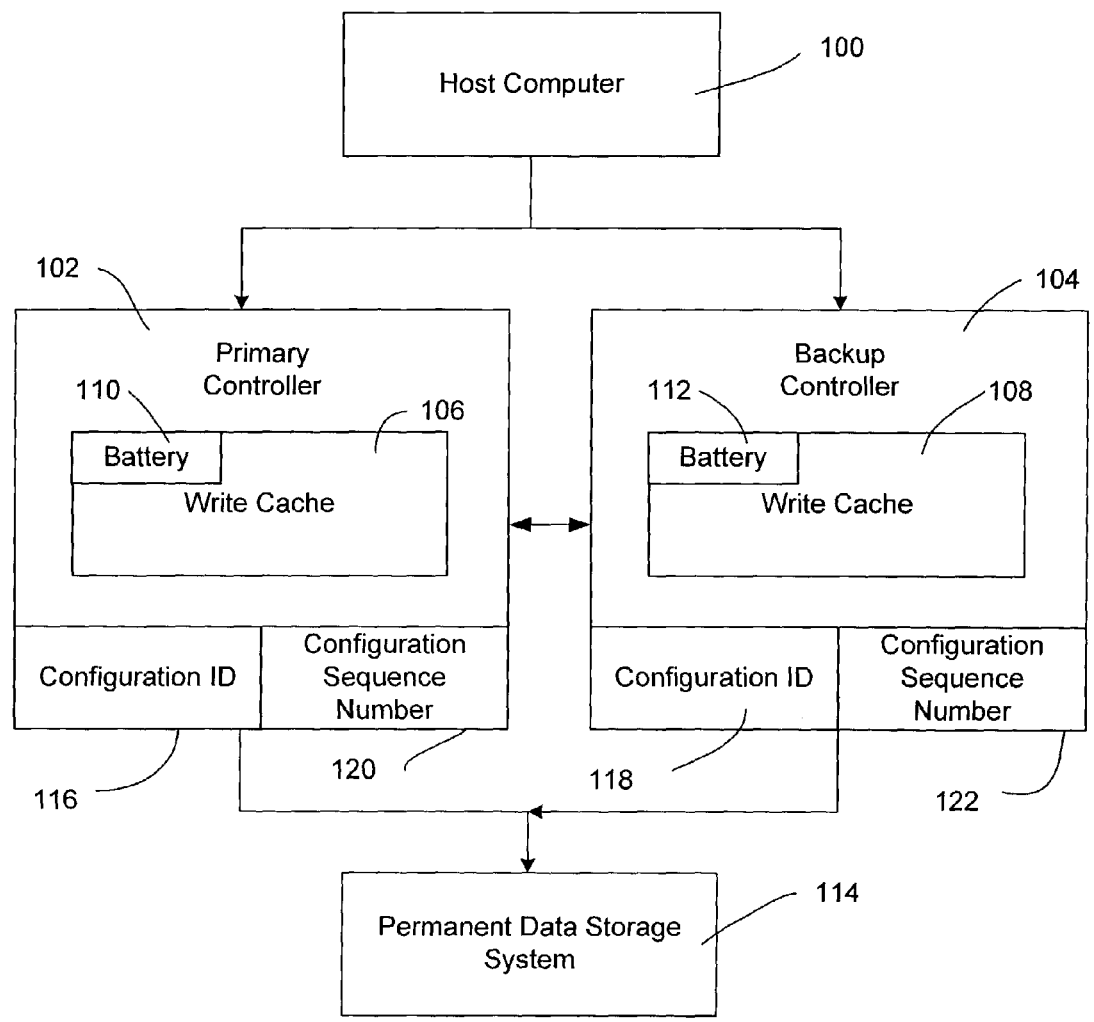
FIG. 1 is a block diagram of computer system according to the present invention.

A computer system in which the present invention may operate is illustrated in FIG. 1. Host computer 100 contains an operating system that executes application programs and causes host computer 100 to store and retrieve data from a permanent data storage system 114. The host computer 100 communicates with permanent data storage system 114 through a pair of independent data storage controllers 102 and 104. Each of the data storage controllers 102 and 104 receives all communications, including all data, from the host 100 and the permanent data storage system 114.

Storage controller 102 is a primary controller. Storage controller 104 is a backup. If the primary controller 102 fails for any reason, the backup controller 104 continues to operate and it assumes all responsibility for communicating data between the host computer 100 and permanent data storage system 114. Until the primary controller 112 fails, it controls all communications between host computer 100 and permanent data storage system 114. The two controllers 102, 104 also communicate to each other as will be discussed more fully below.

Each of the controllers 102, 104 contains a write cache memory 106, 108, i.e., they are configured as a so-called write caches. In this regard, when the host 100 writes data to the data storage system 114, it communicates the data to primary controller 102, which then sends a copy of its data to controller 104. Each of the controllers 112, 104 stores the data into its write cache 106, 108. The primary controller 102 immediately acknowledges that the data has been stored on the data storage system 114. In due course, primary controller 102 writes this data to the permanent data storage system 114. This process is called "flushing." Until the data in the write cache 106 is flushed to the permanent data storage system 114, it is "dirty," a term of art indicating that the data is yet to be stored permanently on the permanent data storage system 114.

Figure 2:
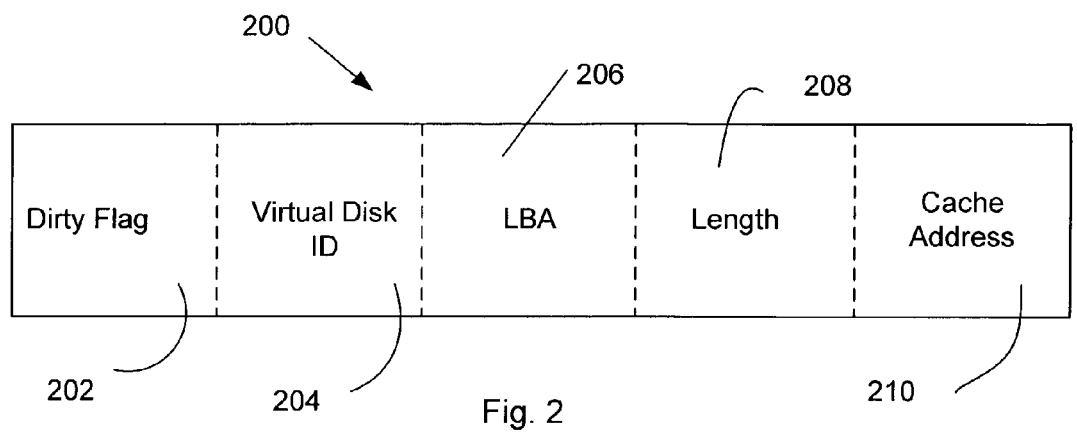
FIG. 2 illustrates the contents of write cache tag.

Referring to FIG. 2, when data is stored into the cache, the controller also updates a table of so-called tags 200 also stored in the write cache. Each tag 200 is composed of a number of fields that identifies the data in the cache. For example, the fields may include the data's cache address 210 and its length 208. The fields may further include the data's destination in the permanent data storage system 114. The destination may include, for example, a virtual disk ID 204 and a logical block address ("LBA") 206. The tag fields may also include a flag 202 indicating whether the data is dirty. This latter flag is reset once the dirty data is flushed to permanent data storage system 114. As conventional in the art, the data itself remains in the cache until the controller needs to replace it with new write data or read data from the permanent data storage system 114. In this manner, the controller may respond to a read request with the data from the high-speed cache 106 rather than retrieving it the relatively slow speed permanent data storage system 114.

Each of the controllers maintains identical contents of its write caches 106, 108. This is preferably done by direct communications between the two controllers. The contents of the backup write cache 108 is controlled by the primary controller 102. Because the contents of each write cache 106, 108 are identical, they are effectively "mirrored".

Each of the write cache memories 106, 108 further contains a battery backup 110, 112. The battery backup operates when power to the write caches from their respective controllers 102 or 104 is disrupted. The battery backups maintain the contents of the respective write caches until power from their controllers is restored.

The write caches 106, 108 are preferably pluggable modules that may be removed from their respective controllers and plugged into other controllers. This procedure facilitates quick "repair" of failed controllers by replacing them.

Because controllers 102, 104 may be swapped in and out with regard to both the write cache 106, 108 and a permanent data storage system 114, the controllers maintain a configuration ID 116, 118 that uniquely describes the hardware environment in which it finds itself. This configuration ID 116, 118 may include whether or not the controller is the primary or backup controller, the identity of the permanent data storage system 114 including, for example, the identity of all its appended storage apparatus, such as disk drives, tape drives and the like. The configuration ID may further preferably include the identity of its write cache 106 or 108. This configuration ID may also preferably be written onto the permanent data storage system 114 including its constituent hardware elements.

Figure 3:
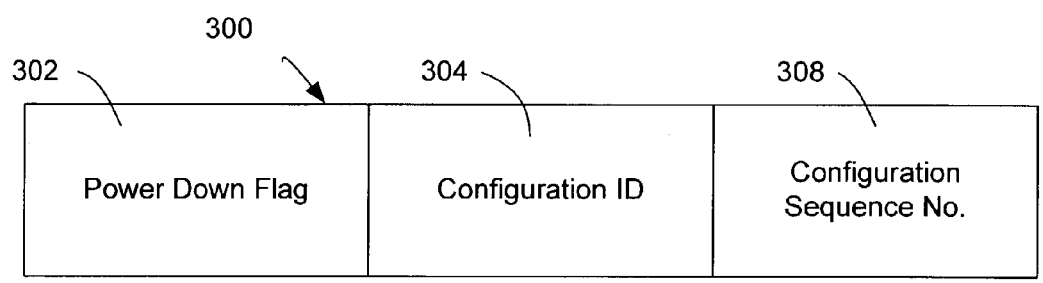
FIG. 3 illustrates the contents of a write cache configuration block.

Referring to FIG. 3, the configuration ID 116 or 118 is also written into a configuration ID field 304 in a write cache configuration information block 300. In this manner, the controller 102, or 104, may know whether the write cache is configured for use in this particular controller in this particular arrangement of hardware. The importance of this will soon be discussed.

The write cache information block 300 further contains two other fields: A first field contains a power down flag 302 indicative of whether or not the controller shutdown properly or whether proper shutdown was prevented to controller failure or power that your. This flag 302 is normally "set" when the controller first powers up and is "reset" when the controller shutdowns properly. The flag is preferably "set" and "reset" by setting the field to particular value. If the flag 302 is set when the controller powers up, the controller knows that a proper shutdown was not completed with respect to this write cache.

During a normal shutdown, the primary or only controller 102 flushes all dirty data present in write cache 106 to the permanent data storage system 114. It then resets that power down flag 302 in both write caches 102 and 104. Therefore, if the primary or only controller 102 discovers that the power down flag 302 is set when it powers up, it knows that there is a possibility that the write cache contains unflushed dirty data. Whether that dirty data should be flushed to the permit data storage system 114 depends on verification of the contents of two other fields in the write cache information block 300. The first of these two other fields is the configuration ID field 304. If the contents of this configuration ID field 304 matches the controller's configuration ID 116, the controller knows that this dirty data, at the time the controller failed or otherwise lost power, was intended to be stored on permanent data storage system 114 associated with this configuration.

The second field that must be verified is a configuration sequence number field 308. The contents of this field 308 must match the configuration sequence number 120 or 122 of the controller. If the sequence number matches, the primary are only controller 102 knows that that dirty data in the write cache 106 or 108 must be flushed the permanent data storage system 114 (assuming, of course, the proper condition of the power down flag and that the configuration ID was verified). The controller then flushes the dirty data present in the write cache to the permanent data storage system 114 and resets the dirty flags 202 of the tags 200 corresponding to the flushed data in both write caches 106 and 108. After the flush of the dirty data is complete, the controller may increment the configuration sequence number and may store it in both the primary and backup controllers 102 and 104 and in both their write caches 106 and 108.

The primary or only controller 102 also increments the configuration sequence number on a proper shutdown and stores the number in both write caches 106 and 108. The controller also resets the power down flag in both write caches on proper shutdown. In general, the primary or only controller 102 increments the configuration sequence number either upon a successful power up or in response to a proper shutdown. It may also be incremented if the configuration of the permanent data storage system 114 is changed, such as when the backup controller has become the primary controller.

If, on power up, the configuration sequence number 308 and the write cache configuration block 300 does not match the configuration sequence number 120 of the primary or only controller 102, the dirty data in a write cache 106 is not written to permanent data storage system 114. In almost all such cases, the configuration sequence number 120 of the controller 102 will be higher than the configuration sequence number 308 stored in the write cache configuration block 300. This indicates that the dirty data contained in the write cache was previously flushed to the permanent data storage system 114. This may occur, for example, if the write cache was in a controller that failed while the other controller continued operate and was properly shutdown thereby flushing the dirty data from the other controller's write cache and incrementing the configuration sequence number. This may further occur if power was lost to both controllers 102 or 104, but only one or the primary controller was previously powered up with the other write cache installed. On power up, the primary or only controller 102 will have discovered the other write cache's power down flag 302 had not been reset and that both the write cache's configuration ID 304 and the configuration sequence number 308 matched those 116 and 120 of the controller 102, and, in response, the controller 102 flushed the dirty data to the permanent data storage system 114.

If the power down flag 302 is not reset, the configuration ID 304 matches that 116 of the controller, but the configuration sequence number 308 is less than the configuration sequence number 120 of the primary or only controller 102, the controller 102 knows that the dirty data present in the write cache has already been flushed to the permanent data storage system 114. It therefore does not flush the dirty data to the permanent data storage system, but simply sets the configuration sequence number 308 to the current configuration sequence number 120 of the controller 102. Depending on data storage's system configuration, the controller may still incremented the controller's configuration sequence number 120 and store the incremented number and the configuration sequence number field 308 in the write cache configuration block 300.

By using configuration sequence numbers, two, mirrored, battery powered write caches may be used to flush unflushed dirty data from one of the two upon primary (or only) controller power up without improperly flushing the same data twice when the second of the two is powered up in a primary (or only) controller.

The above procedure also permits a write cache containing data from a first data storage system to be plugged into a different data storage system without the dirty data for the first data storage system being destroyed. Nothing in the write cache configuration block 300 is modified if the write cache's configuration ID 304 does not match the configuration ID 116 of the controller 102. Rather the controller may be configured to signal this mismatch to an operator who may correct the situation by either removing the write cache and installing it into the proper data storage system, or by manually overriding the data storage system so that they write cache may be used regardless.

The above-described preferred embodiment may be varied by those skilled in the art, and the description should not be taken as a limitation on the scope of the appended claims. For example, the configuration ID and the configuration sequence number may be combined into one field.

What is claimed is:

1. A method of recovering dirty write cache data after loss of power to a primary controller associated with a write cache, comprising:
   providing means for retaining information in the write cache in absence of controller power;
   verifying whether a power down flag stored in the write cache indicates that the write cache was not properly shutdown;
   verifying whether a configuration ID stored in the write cache matches a configuration ID stored in the controller;
   verifying whether a configuration sequence number stored in the write cache corresponds to a configuration sequence number stored in the controller; and
   flushing dirty data present in the write cache to a permanent data storage system when the power down flag indicates that the write cache was not properly shutdown, the configuration ID matches that stored in the primary controller and the configuration sequence number matches the configuration sequence number stored in the primary controller.

2. The method of claim 1 further including incrementing the configuration sequence number stored in the primary controller upon a proper shutdown and storing the configuration sequence number in the write cache if the write cache's configuration ID matches the configuration ID stored in the primary controller.

3. The method of claim 2 further including storing the configuration sequence number in the write cache of a backup controller if the write cache's configuration ID matches the configuration ID stored in the backup controller.

4. The method of claim 2 further including incrementing the configuration sequence number stored in the primary controller upon power up and storing the configuration sequence number in the write cache if the write cache configuration ID matches the configuration ID stored in the primary controller.

* * * * *